Patented Apr. 1, 1930

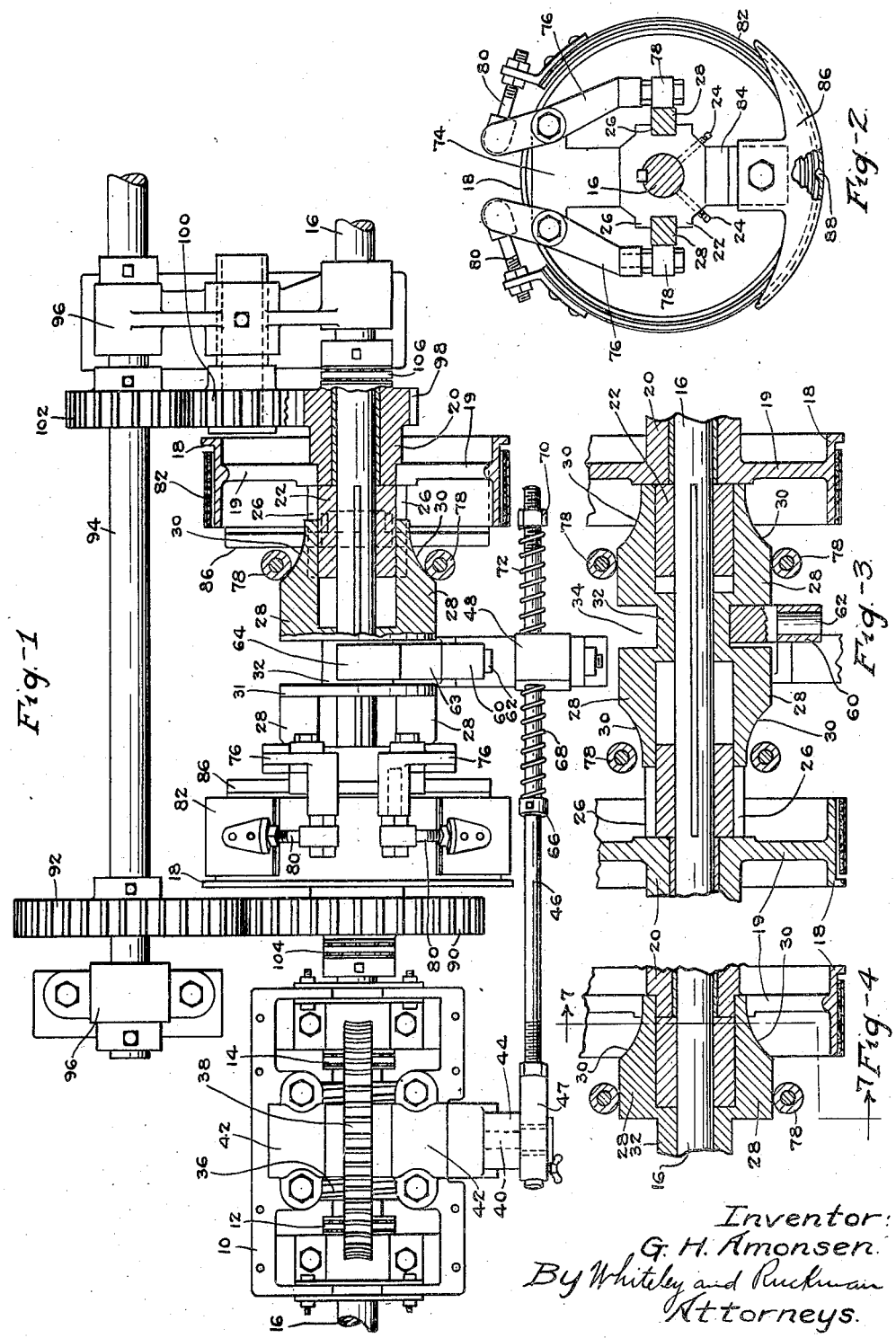

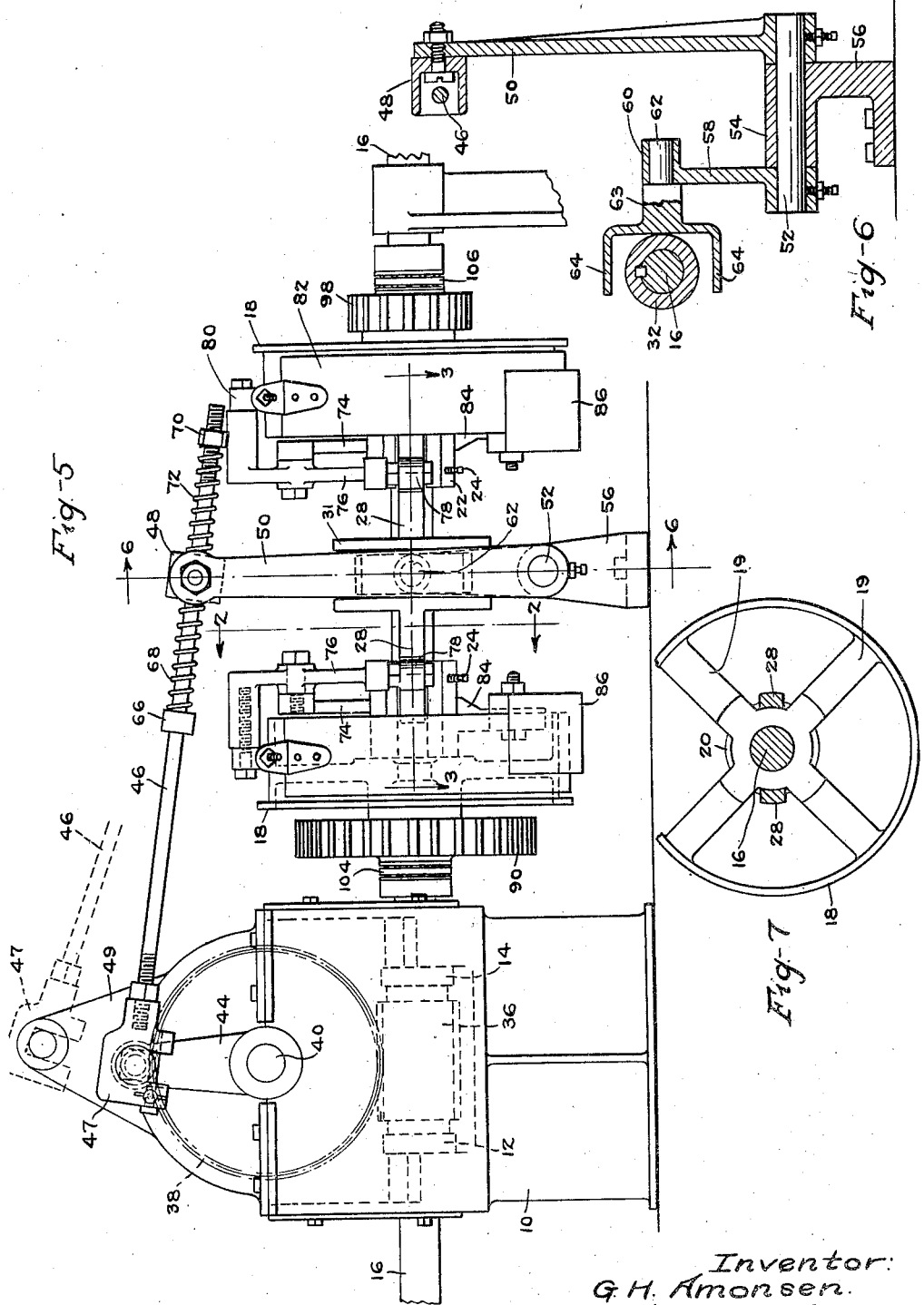

1,752,411

UNITED STATES PATENT OFFICE

GEORGE H. AMONSEN, OF MINNEAPOLIS, MINNESOTA

DRIVING MECHANISM FOR MACHINES

Application filed June 9, 1928. Serial No. 284,123.

My invention relates to driving mechanism for machines. An object of the invention is to provide mechanism by means of which the motion of a shaft rotating continuously in one direction may be employed for imparting alternate forward and reverse rotation to a driven member. Another object is to provide mechanism of this character in which the reversing mechanism may be readily disconnected so that the rotating shaft may be employed when desired for driving continually in one direction. Another object is to provide mechanism of this character which embodies both frictional and positive clutch devices so arrranged that in case the frictional clutch slips, then the positive clutch is caused to operate. My mechanism may be employed for operating various machines such as laundry machines.

The full objects and advantages of my invention will appear in connection with the detailed description thereof, and the novel features of my inventive idea will be particularly pointed out in the claims.

In the accompanying drawings which illustrate a practical embodiment of my invention, Fig. 1 is a view of the mechanism partly in top plan and partly in horizontal section. Fig. 2 is a view in vertical section on the line 2—2 of Fig. 5. Fig. 3 is a fragmentary view in horizontal section on the line 3—3 of Fig. 5 but with certain parts moved toward the right. Fig. 4 is a fragmentary view similar to the right hand portion of Fig. 3 but showing some parts in a different position. Fig. 5 is a side elevational view of the device. Fig. 6 is a view in vertical section on the line 6—6 of Fig. 5. Fig. 7 is a view in section on the line 7—7 of Fig. 4.

Referring to the construction shown in the drawings, the numeral 10 designates a frame which is provided with bearings including end thrust bearings 12 and 14, for a shaft 16 which is intended to be rotated continually in one direction from any suitable source of power. Two similar drums 18 having spokes 19 are oppositely disposed in spaced relation to each other and are loosely mounted on the shaft 16 by means of hubs 20. Collars 22 are keyed on the shaft 16 and as shown in Fig. 2 are adjustably held in longitudinal direction by set screws 24 so that the collars may be held snugly against the inner ends of the hubs 20. The collars as shown in Fig. 2 have angular shaped exterior surfaces which at diametrically opposite places are provided with slideways 26. These slideways slidably receive pairs of jaws 28 having inclined surfaces 30 and the two pairs of jaws extend out from circular flanges 31 connected by a central reduced portion 32, the inner surface of which is splined on the shaft 16 and the outer surface of which provides a circumferential recess 34. Secured to the shaft 16 between the bearings 12 and 14 there is a worm 36 which meshes with a worm gear 38 secured to a transverse shaft 40 mounted in bearings 42 carried by the frame 10. A crank arm 44 is secured to one end of the shaft 40 and a rod 46 is adjustably secured to a connecting member 47 adapted to be detachably secured to the outer end of the arm 44. When the member 47 is detached it is supported by a standard 49 extending up from the frame, such detached position being indicated by dotted lines in Fig. 5. The rod 46 passes slidably through a hollow member 48 which is secured to the upper end of an arm 50 whose lower end is secured to one end of a short transverse rock shaft 52 mounted in a bearing 54 carried by a floor member 56. The other end of the shaft 52 has a shorter arm 58 secured thereto. The upper end of the arm 58 has a bearing 60 for receiving a trunnion 62 formed on the outer end of a fork 63 having two branches 64 which fit into the circular recess 34 between the flanges 31. The rod 46 at an intermediate portion thereof has a collar 66 secured thereto and a coiled spring 68 is interposed between this collar and the hollow member 48. The free end of the rod 46 is threaded and provided with a nut 70. A coiled spring 72 is interposed between this nut and the hollow member 48. It is apparent therefore that the arms 50 and 58 will be oscillated through pressure resiliently applied and the fork 63 will cause the member carrying the pairs of jaws 28 to reciprocate by pressure resiliently applied. The collars 22 are provided with upwardly extending arms 74 to which pairs of offset levers 76 are intermediately pivoted. The inner ends of these levers carry rollers 78 adapted to ride on the inclined surfaces 30. The outer ends of the levers 76 are connected by adjustable links 80 with the ends of bands 82. The collars 22 are provided with downwardly extending arms 84 to which curved members 86 are secured. These curved members lie outside of the bands and not only serve as counterweights but are provided centrally with projections 88 which are engaged by the bands when released from the drums so that dragging of bands on the drums is prevented. A spur gear 90 is secured to the hub 20 of the left hand drum 18 and this gear is in mesh with a spur gear 92 secured to a counter shaft 94 mounted in bearings 96. A spur gear 98 is secured to the hub 20 of the right hand drum 18 and this gear meshes with an idler gear 100 which in turn meshes with a spur gear 102 secured to the shaft 94. A thrust bearing 104 holds the gear 90 in place and a thrust bearing 106 holds the gear 98 in place.

The operation and advantages of my invention will be understood from the foregoing description. Rotation of the shaft 16 causes rotation of the traverse shaft 40 through the worm 36 and worm gear 38 which constitutes a reduction gearing. The arm 44 secured to the end of the shaft 40 will reciprocate the rod 46 and cause the arms 50 and 58 to oscillate so that the fork 63 causes the member carrying the pairs of jaws 28 to reciprocate on the shaft 16. When the jaws are reciprocated to the right into the position shown in Fig. 3, the right hand drum 18 is caused to rotate in connection with the shaft 16 due to the fact that the rollers 78 ride up on the inclined surfaces 30. The band 82 is by the movement of the levers 76 tightened around the drum. The jaws 28 move toward the right until they butt against the hub 20, the spring 68 still being under tension. If there is any appreciable slipping of the band on the drum so that the jaws rotate faster than the drum, then the jaws under the tension of the spring 68 have a further forward movement so that their ends enter recesses in the hub 20 as will be understood from Figs. 4 and 7. The drum will now be positively driven. Rotation of the drum and the gear 98 will cause rotation of the shaft 94 in one direction. When the rotation of the crank arm 44 causes the jaws to move to the left, an action similar to that just described occurs with regard to the left hand drum and the rotation of the gear 90 causes the shaft 94 to rotate in the opposite direction. Under such conditions, the device to be operated such, for instance, as a washing machine, will be driven from the shaft 94 and will be given an oscillatory movement. If it is desired to drive a device continuously in one direction, then the rod 46 is disconnected in the manner previously stated and the device is driven directly from the shaft 16.

I claim:

1. Mechanism of the class described comprising a rotatable shaft, two clutch devices each having a member loose on said shaft and a member fast on said shaft, gears secured for rotation respectively with said loose members, a counter shaft, a gear secured to said counter shaft and meshing with one of said first mentioned gears, a second gear secured to said counter shaft, an idler gear interposed between said last mentioned gear and the other of said first mentioned gears, a transverse shaft connected to and driven by said rotatable shaft, a crank arm secured to said transverse shaft, a rod attached to the outer end of said crank arm, a rock shaft, an arm secured to said rock shaft and through the outer end of which said rod passes slidably, two coiled springs surrounding said rod and engaging opposite sides of said arm respectively, means on said rod for restraining the outer ends of said springs, a forked arm secured to said rock shaft, a slidable member on said rotatable shaft interposed between said clutch devices and engaged by said forked arm, and connections between said slidable member and said fast members whereby the latter are connected to said loose members in alternation.

2. Mechanism of the class described comprising a rotatable shaft, two frictional clutch devices each having a member loose on said shaft and a member fast on said shaft, hubs for said loose members through which said rotatable shaft passes, gears secured to said hubs respectively, a counter shaft, a gear secured to said counter shaft and meshing with one of said first mentioned gears, a second gear secured to said counter shaft, an idler gear interposed between said last mentioned gear and the other of said first mentioned gears, a transverse shaft connected to and driven by said rotatable shaft, a crank arm secured to said transverse shaft, a rod secured to the outer end of said crank arm, a shifting device through which said rod passes slidably, two coiled springs surrounding said rod and engaging opposite sides of said shifting device respectively, means on said rod for restraining the outer ends of said springs, a slidable member on said rotatable shaft interposed between said clutch devices and engaged by said shifting device, connections between said slidable member and said fast members whereby the latter are connected to said loose members in alternation, the hubs of said loose members having notches, and projections on said slidable member which are caused to enter said notches by the action of said springs when said fast members slip on said loose members.

3. Mechanism of the class described comprising a rotatable shaft, two clutch devices each having a member loose on said shaft and a member fast on said shaft, a counter shaft, driving means between one of said loose members and said counter shaft for rotating the latter in one direction, driving means between the other of said loose members and said counter shaft for rotating the latter in the opposite direction, a transverse shaft connected to and driven by said rotatable shaft, a crank arm secured to said transverse shaft, a rod attached to the outer end of said crank arm, a rock shaft, an arm secured to said rock shaft and through the outer end of which said rod passes slidably, two coiled springs surrounding said rod and engaging opposite sides of said arm respectively, means on said rod for restraining the outer ends of said springs, a forked arm secured to said rock shaft, a slidable member on said rotatable shaft interposed between said clutch devices and engaged by said forked arm, and connections between said slidable members and said fast members whereby the latter are connected to said loose members in alternation.

4. Mechanism of the class described comprising a rotatable shaft, two clutch devices each having a member loose on said shaft and a member fast on said shaft, a counter shaft, driving means between one of said loose members and said counter shaft for rotating the latter in one direction, driving means between the other of said loose members and said counter shaft for rotating the latter in the opposite direction, a transverse shaft connected to and driven by said rotatable shaft, a crank arm secured to said transverse shaft, a rod secured to the outer end of said crank arm, a shifting device through which said rod passes slidably, two coiled springs surrounding said rod and engaging opposite sides of said shifting device respectively, means on said rod for restraining the outer ends of said springs, a slidable member on said rotatable shaft interposed between said clutch devices and engaged by said shifting device, connections between said slidable member and said fast members whereby the latter are connected to said loose members in alternation, the hubs of said loose members having notches, and projections on said slidable member which are caused to enter said notches by the action of said springs when said fast members slip on said loose members.

In testimony whereof I hereunto affix my signature.

GEORGE H. AMONSEN.